(12) United States Patent
Johnson et al.

(10) Patent No.: US 6,680,790 B2
(45) Date of Patent: *Jan. 20, 2004

(54) SWITCHING DISPLAY DEVICE HAVING A LARGE APERTURE

(75) Inventors: Mark Thomas Johnson, Eindhoven (NL); Paul Van Der Sluis, Eindhoven (NL); Anna-Maria Janner, Eindhoven (NL); Hugo Johan Cornelissen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 106 days.

This patent is subject to a terminal disclaimer.

(21) Appl. No.: 09/965,454

(22) Filed: Sep. 27, 2001

(65) Prior Publication Data

US 2002/0036817 A1 Mar. 28, 2002

(30) Foreign Application Priority Data

Sep. 28, 2000 (EP) .............................. 00203379

(51) Int. Cl.[7] ................................ G02F 1/03
(52) U.S. Cl. ....................... 359/245; 359/290
(58) Field of Search ................. 359/245, 247, 359/291, 290, 298, 320, 315; 349/113

(56) References Cited

U.S. PATENT DOCUMENTS

| 4,426,643 A | 1/1984 | Martin ..................... 340/713 |
| 5,056,895 A | 10/1991 | Kahn .......................... 359/87 |
| 2002/0036816 A1 * | 3/2002 | Johnson et. al ............. 359/245 |

* cited by examiner

*Primary Examiner*—Georgia Epps
*Assistant Examiner*—Richard Hanig

(57) ABSTRACT

The invention relates to a switching mirror display having an increased aperture. The display comprises pixel elements (20) having a switchable layer (3), which is switched between a reflecting and an absorbing state by changing a hydrogen content of the switchable layer (3). Applying a DC voltage on electroconductive layers (11, 13) changes the hydrogen content. These electroconductive layers (11, 13) sandwich a stack of layers comprising the switchable layer (3), which stack has been deposited on a transparent substrate (1). The display is being viewed from a side (24) of the substrate on which the stack is deposited. The pixel element (20) is driven by an active matrix element (22). The switchable layer (3) extends across the active matrix element (22) and conceals this element. This increases the aperture of the display.

5 Claims, 2 Drawing Sheets

SWITCHING DISPLAY DEVICE HAVING A LARGE APERTURE

FIELD OF THE INVENTION

The invention relates to a display device having a viewable side and pixel elements which are reversibly switchable between at least a first state of reflecting light and a second state of absorbing light, said pixel elements comprising a stack of layers including a switchable layer of an optically switchable material which brings about a switch from the first state to the second state of the pixel element, said layer being switched by electric switching means.

DESCRIPTION OF THE RELATED ART

U.S. Pat. No. 5,905,590 describes a switching device comprising a switching film including hydrides of gadolinium or other trivalent metal. By exchange of hydrogen, the switching film can be reversibly switched from a transparent state to a mirror-like state with zero transmission via an intermediate black absorbing state. The switching film is comprised in a stack of layers, which is deposited on a transparent substrate. By making a pattern in the switching film and providing the patterned switching film with transparent electrodes, a thin display can be manufactured. The display is viewed from a side of the substrate on which the stack is deposited.

The display is driven by switching means. The switching means are comprised in the pixel elements and determine the aperture ratio of the display, i.e. the ratio of the display area of the display, which is effective in the switching with respect to the total surface area of the display.

SUMMARY OF THE INVENTION

It is an object of the invention to provide a switching mirror device, which has an increased aperture ratio. To this end, the invention is characterized in that the electric switching means are positioned behind the layer of optically switchable material with respect to the viewable side of the display device. Thus, the electric switching means no longer determine the aperture ratio of the display, and therefore the aperture ratio is increased considerably.

Advantageous embodiments of the invention are described in the dependent claims.

These and other aspects of the invention will be elucidated with reference to the embodiments described hereinafter.

BRIEF DESCRIPTION OF THE DRAWINGS

In the drawings.

In general, like reference numerals identify like elements.

DETAILED DESCRIPTION OF THE INVENTION

Figure 1A:
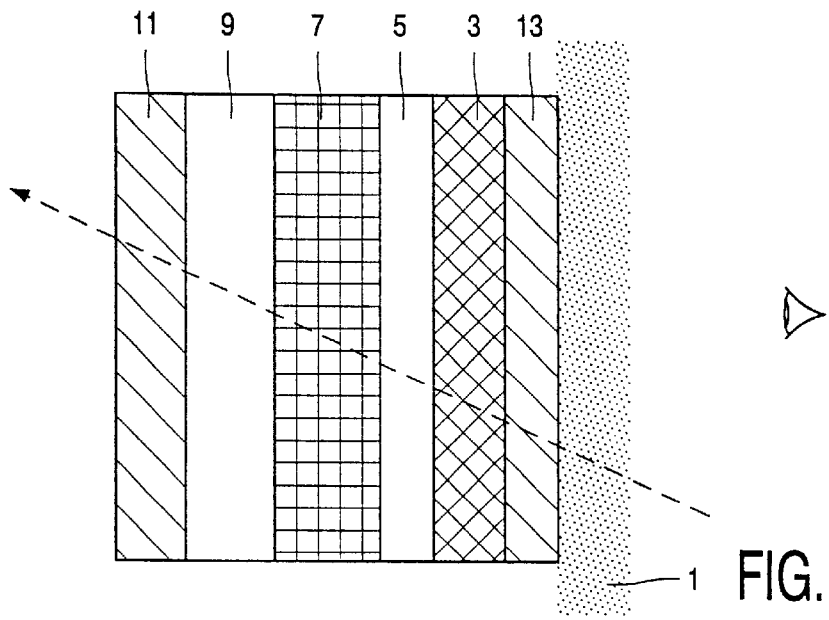
FIGS. 1A, 1B are cross-sections of a stack of layers of a switching mirror display according to the prior art.
Figure 1B:
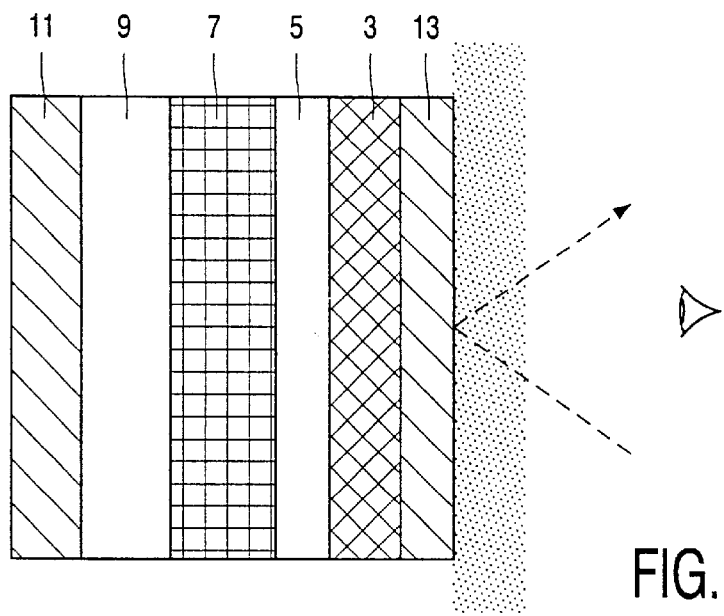
Figure 2:
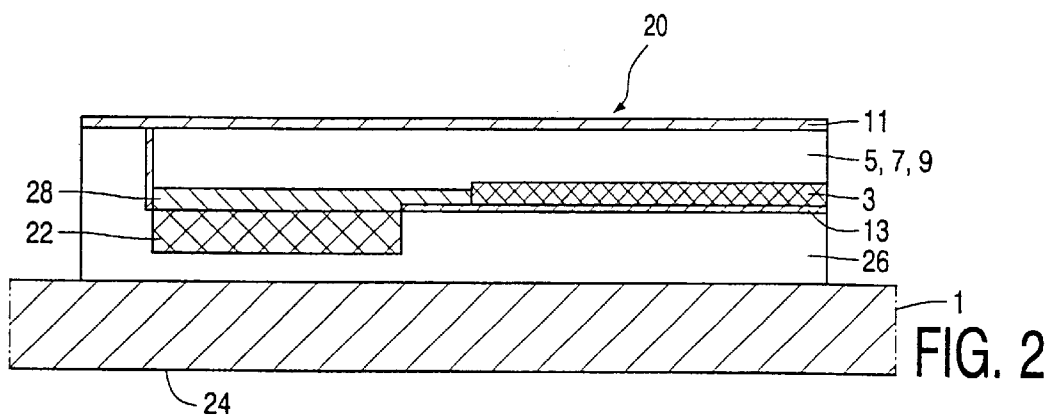
FIG. 2 is a cross-section of a pixel element of a switching mirror display according to the prior art.

FIGS. 1A, 1B are cross-sections of a switching mirror device according to the prior art. The layer thicknesses are not drawn to scale. The device comprises a transparent glass plate 1 on which a stack of layers is deposited by means of conventional methods, such as vacuum evaporation, sputtering, laser ablation, chemical vapor deposition or electroplating. The stack comprises a layer 3 of $LMgH_x$ as a switching film with a thickness of about 200 nm (L represents Ni, Sc or Y or an element from the Lanthanide series of the Periodic System of Elements), a palladium layer 5 with a thickness of about 5 nm, a layer 7 of an ion-conducting electrolyte with a thickness in the range of 0.1 to 10 $\mu$m and a hydrogen storage layer 9.

$GdMgH_x$ is a very suitable switching material, as far as optical properties and switching time are concerned, but other trivalent magnesium-lanthanide alloys might be employed as well. The switching film 3 may be reversibly switched between a low-hydrogen (x<~2) composition and a saturated high-hydrogen (x~5) composition, via a medium hydrogen composition. The various compositions have different optical properties. At a low hydrogen content, the film has a metallic character and is non-transparent. The film then reflects like a mirror. At a high hydrogen content, the film 3 is semiconductive and transparent, whereas at intermediate hydrogen concentration the switching film is absorbing.

The palladium layer 5 serves to increase the rate of hydriding or dehydriding, and thus the switching speed. Other electro-catalytic metals or alloys, such as platinum or nickel might also be used. In addition, this metal layer protects the underlying switching film 3 against corrosion by the electrolyte. The palladium layer 5 may have a thickness in the range between 2 and 25 nm. Thin layers of 2 to 10 nm are preferred, however, because the thickness of the film determines the maximum transmission of the switching device.

For a proper functioning, also an H-storage layer 9 and an H-ion conducting electrolyte layer 7 are required. A good H-ion conductor electrolyte is $ZrO_2H_x$. The electrolyte must be a good ion conductor, but it must be an isolator for electrons in order to prevent self-discharge of the device. Use is most preferably made of transparent solid-state electrolytes, because of the simplicity of the device; they prevent sealing problems, and the device is easier to handle.

If the transparent state of the switching mirror is required, a good candidate for the storage layer is $WO_3$.

The stack is sandwiched between two transparent electroconductive electrode layers 11, 13 of, for example, indium-tin oxide (ITO). Electrode layers 11, 13 are connected to an external current source (not shown). Additionally, a barrier layer to prevent the penetration of gas into the stack comprising e.g. $ZrO_2H_y$ may be applied on top of layer 9. This layer is not shown in the Figures.

By applying a DC current, the low-hydrogen, mirror-like composition is converted to the high-hydrogen composition, which is transparent and neutral gray. The device now acts as a transparent window, as is shown in FIG. 1A by means of the dashed line. When reversing the current, the switching film 3 returns to the low-hydrogen state, which is mirror-like and non-transparent, as is shown in FIG. 1B. The switching time is comparable to that of conventional electrochromic devices. The device can operate at room temperature. Once the mirror has reached the desired optical state, virtually no hydrogen will flow through the device. This means that the display will hold information with a very low power.

A problem with the switching mirror device according to the prior art is that at the viewable side 24 of pixel element 20, i.e. the side from which the display is viewed, an element 22 of a so-called active matrix is visible, as is shown in FIG.

2. This active matrix (Thin Film Transistors, rows, columns, storage capacitors, etc.) comprises the electric elements that are necessary for switching the pixel elements. The active matrix is embedded in an embedding layer 26, which is also comprised in the pixel element. The active matrix is electrically connected to the electrode layers 13, 15. An isolation layer 28 isolates the active matrix element 22 from the layers of the stack.

In the configuration according to the prior art, the surface area occupied by the active matrix cannot be used for the optically active layer 3. This reduces the aperture of the display if the display is viewed from the viewable side 24. In particular, as the driving circuits are relatively complex and since the transistors are preferably made relatively large in order to handle the high currents needed for charging the switching mirror display, the aperture is relatively small.

Figure 3A:
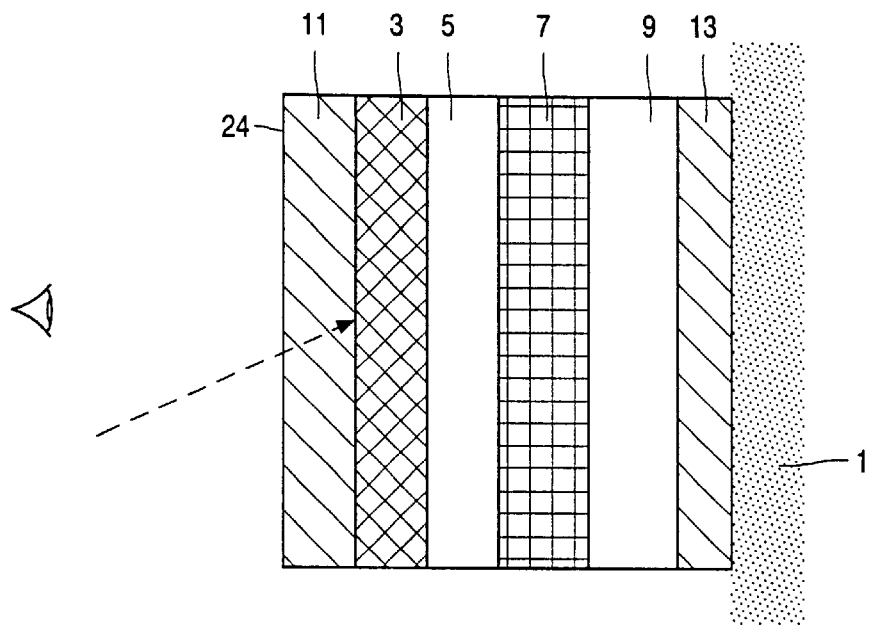
FIGS. 3A, 3B show a stack of layers of a switching mirror display according to the invention.
Figure 3B:
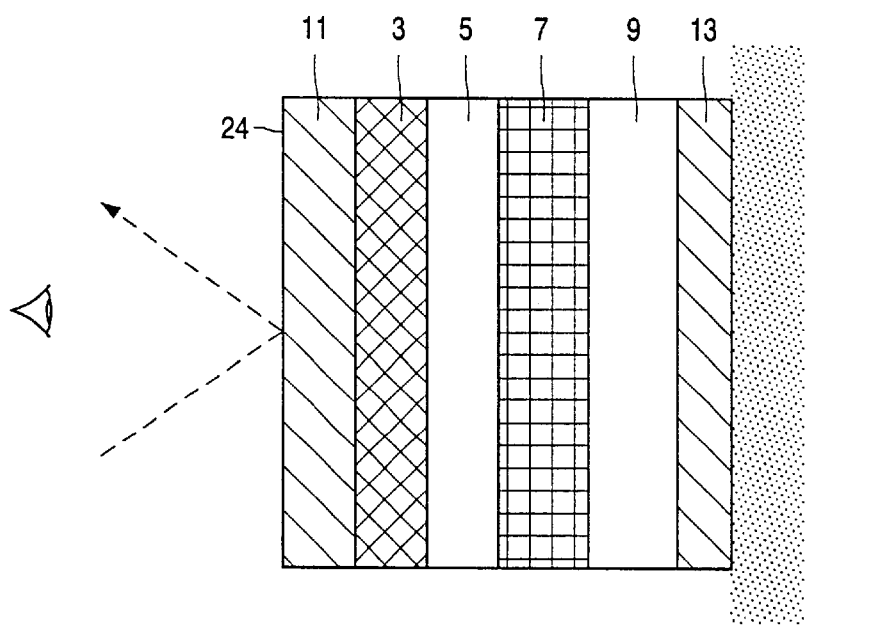

FIGS. 3A, 3B show a stack of layers of a switching mirror display according to the invention. In this case, the display is viewed from a side 24 of the substrate on which the stack is deposited. The order of the stack comprising the switching layer 3 has been reversed. This means that, in an order starting from the surface of the substrate, the stack comprises a first layer for storing hydrogen 9, a second layer for conducting hydrogen 7 and the switchable layer 3.

The stack is sandwiched between electroconductive electrode layers 11 and 13. The optically switchable material 3 is switched from a state of reflecting light to a state of absorbing light by changing a density of hydrogen. Applying a DC voltage on the electroconductive layers changes the density of hydrogen.

Good results were obtained with a stack of layers wherein the second layer comprises an electrolyte material, e.g. $ZrO_2H_x$, a separation layer 5 being present between the second layer 7 and the switchable layer 3, and the first layer 9 comprises $GdMgH_x$.

Figure 4:
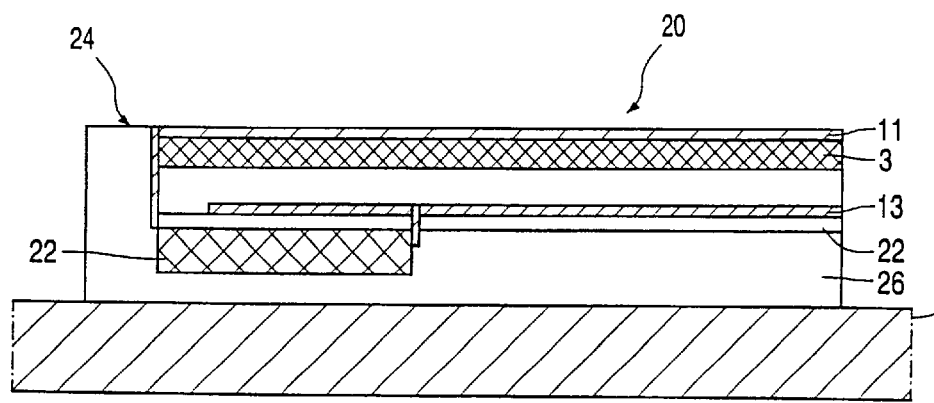
FIG. 4 is a cross-section of a pixel element of a switching mirror device according to the invention.

FIG. 4 is a cross-section of a pixel element 20 according to the invention. The order of the layers of the stack is reversed (as shown in more detail in FIGS. 3A, 3B) and the switching layer 3 extends across the active matrix element 22. The electric switching means are thus positioned behind the layer of optically switching material with respect to the viewable side 24 of the display device. When the switching layer is switched from a reflecting state to an absorbing state and reversibly, the active matrix element 22 is not visible. The active matrix element does not determine the aperture any longer, and consequently, the aperture is increased.

The switching layer 3 also conceals the conducting layer 13 located between the substrate and the switching layer. Therefore, the conducting layer 13 does not need to be transparent and may comprise metal, which improves the conductivity.

Within the range of the invention, the same effect is obtained if the electrode layer 13 comprises a reflective metal, whereas the switching layer is switched from a transmissive state to an absorbing state. Due to the reflectivity of the metal electrode layer, the display still switches from a reflective state to the absorbing state. Since the total thickness of the stack is less than 1 $\mu$m, there will be no problems due to parallax errors.

The same effect may also be obtained if the layers between the switching layer and the substrate comprise light-absorbing materials, whereas the switching mirror is switched between the reflective state and the transparent state. Due to the absorbing property of these layers, the display is effectively switched from the reflective to the absorbing state. Absorbing layers may be obtained, e.g. when the electrolyte layer 7 comprises CaF with defects, the storage layer 9 comprises an absorbing hydride and the electrode 13 comprises an absorbing material such as $Cr/CrO_x$.

Since the transparent state of the switching mirror is not required, a second $LMgH_x$ layer can be used as a storage layer (L represents Ni or Y or an element of the Lanthanide series). Thus, the hydrogen storage layer comprises essentially the same compounds as the switchable layer, but the mutual ratio in which the various compounds occur in the layer may differ from that in the switchable layer. This will result in a symmetric device, which has the advantage that the device can be thinner. Moreover, for switching between the reflecting and the absorbing state, less charge (H-ions) needs to be transported, i.e. less current is needed for switching. Typically, for a 100 nm thin $Gd_{40}Mg_{60}$-hydride layer, a charge of about 0.1 C/cm$^2$ is needed for transporting all hydrogen from one layer to another in order to switch between the transparent and the reflecting state. For switching only between the reflecting and the absorbing state, less H has to be transported (requiring about 0.05 C/cm$^2$).

A symmetric device may be used for an application where only switching between the reflective and absorbing state is necessary. If the viewable side 24 of the display device is provided with a scattering foil, the contrast of the display is improved. Due to the presence of the foil, switching-mirror pixels in the reflecting state will look white, whereas switching mirror pixels in the absorbing state will look black. Such a type of display may be used as, e.g. a document reader. This principle, combined with color filters, will yield a full-color document reader.

Alternatively, the surface of the reflecting layer could be intentionally roughened to create the desired scattered reflection to provide a white or black looking reflective state.

In summary, the invention relates to a switching mirror display having an increased aperture. The display comprises pixel elements having a switchable layer, which is switched between a reflecting and an absorbing state by changing a hydrogen content of the switchable layer. Applying a DC voltage on electroconductive layers changes the hydrogen content. These electroconductive layers sandwich a stack of layers comprising the switchable layer, which stack has been deposited on a transparent substrate. The display is being viewed from a side of the substrate on which the stack is deposited. The pixel element is driven by an active matrix element. The switchable layer extends across the active matrix element and conceals this element. This increases the aperture of the display.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim.

What is claimed is:

1. A display device having a viewable side and pixel elements which are reversibly switchable between at least a first state of reflecting light and a second state of absorbing light, said pixel elements comprising:
    a stack of layers including a switchable layer of an optically switchable material which brings about a switch from the first state to the second state of the pixel element; and electric switching means for switching said switchable layer the electric switching means being positioned behind the switchable layer with respect to the viewable side of the display device, and the optically switchable material being switched by changing a density of hydrogen.

2. A display device having a viewable side and pixel elements which are reversibly switchable between at least a first state of reflecting light and a second state of absorbing light, said pixel elements comprising:

a stack of layers including a switchable layer of an optically switchable material which brings about a switch from the first state to the second state of the pixel element; and electric switching means for switching said switchable layer, the electric switching means being positioned behind the switchable layer with respect to the viewable side of the display device, wherein the stack of layers is deposited on a surface of a substrate, the stack comprising, in an order starting from the surface of the substrate, a first layer for storing hydrogen, a second layer for conducting hydrogen, and the switchable layer, the optically switchable material being switched by changing a density of hydrogen.

3. A display device as claimed in claim 2, wherein the switchable layer comprises LMgHx, in which L represents Ni, Sc or Y or an element of the Lanthanide series and the first layer for storing hydrogen comprises a material comprising essentially the same compounds as the switchable layer.

4. A display device as claimed in claim 3, wherein the viewable side of the display is provided with a scattering foil.

5. A display device as claimed in claim 3, wherein a surface of the switchable layer is roughened so as to scatter light.

* * * * *